July 4, 1944.   J. ZWEEKLY   2,353,109
LAYOUT GAUGE
Filed Feb. 26, 1943
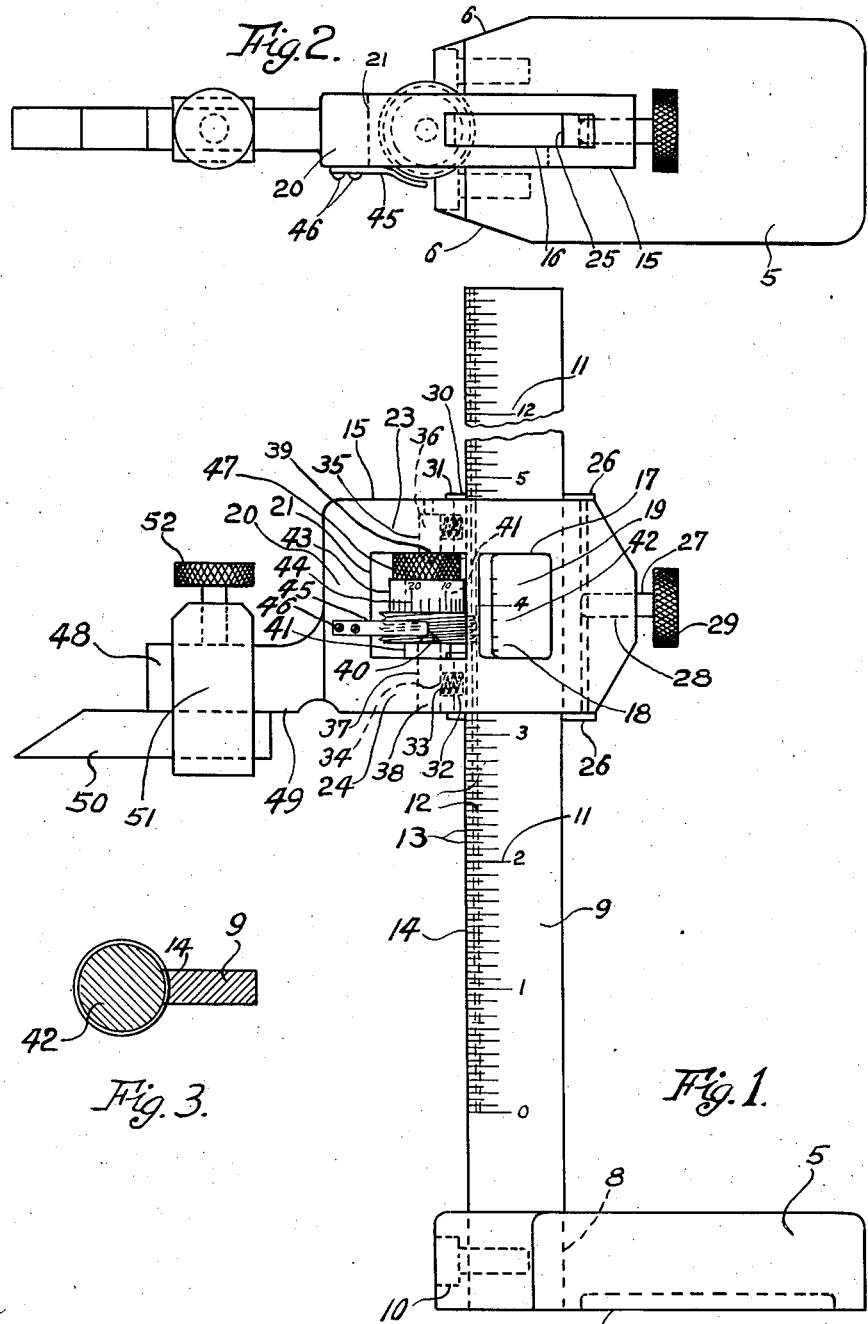
INVENTOR.
JAMES ZWEEKLY
BY Barthel + Bugbee Patented July 4, 1944

2,353,109

UNITED STATES PATENT OFFICE 2,353,109

LAYOUT GAUGE

James Zweekly, Detroit, Mich.

Application February 26, 1943, Serial No. 477,195

10 Claims. (Cl. 33—170)

The present invention relates to measuring instruments and, more particularly, to a work layout gauge.

The primary object of the invention is to provide a gauge having an offset contact member movably mounted on a slide which may be quickly moved to various positions and micrometrically adjusted after being preset, thereby saving considerable time in adjusting the various gauge parts.

Another object of the invention is to provide a gauge of the above-mentioned type which is absolutely accurate thereby insuring accuracy in the laying out of work due to the fine adjustments which may be made on the improved device.

Another object of the invention is to provide a gauge having a slide head which may be quickly moved along a beam to an approximate reference point and to provide a micrometric adjustment to facilitate the movement of the slide head a fractional part of an inch on either side of the predetermined reference point.

Another object of the invention is to provide a gauge of the above-mentioned type having means for disengaging the micrometric adjustment and rendering the same inoperative during the shifting of the slide head along the beam and to provide centering pins for the micrometric adjusting means to insure against inaccuracies created by wear and foreign matter gaining access to the various parts of the micrometric adjusting means.

Another object of the invention is to provide a layout gauge having a worm micrometric adjuster which is calibrated and is capable of being moved into engagement with partial threads along one edge of the beam so that the micrometric worm may be preset before the sliding head is moved to a reference point on the beam whereupon the engagement of the micrometric worm with the threads along one edge of the beam will cause the head to be moved from said reference point a predetermined distance in accordance with the presetting of the micrometric adjustment.

Another object of the invention is to provide a pair of spring loaded wear shoes on each side of the micrometric worm to facilitate the disengaging thereof from the threads along one side of the gauge beam.

Other objects and advantages of the invention will become apparent during the course of the following description of the accompanying drawing wherein:

Figure 1 is a side elevational view of the layout gauge embodying the invention, illustrating in detail the various parts of the micrometric adjusting means;

Figure 2 is a top plan elevational view showing the general arrangement of the various parts; and Figure 3 is a horizontal cross sectional view on line 3—3 of Figure 2 looking in the direction of the arrows illustrating the micrometric adjusting worm and the manner in which the threads thereof engage the partially threaded edge of the beam.

In the drawing wherein for the purpose of illustrating the invention and wherein like reference characters are employed to designate like parts of the same, the reference character 5 is generally employed to designate a substantially rectangular base having tapered edges 6 and the relatively flat bottom wall 7 capable of being placed upon a machine base or bed to insure accuracy during the laying out of the work and making various other adjustments. Formed at one end of the base 5 is a vertical slot 8 for receiving the lower end of a beam 9 perpendicular to the base 5. A set screw 10 is threaded in one end of the base for locking the beam 9 in position. Graduations 11 are marked off into aliquot parts of an inch by secondary graduations 12. The graduations 12 are further divided into tertiary markings 13. One edge of the beam 9 is provided throughout its length with a series of partial screw threads 14 which are in alignment with the markings 13.

Movable along the beam 9 is a slide frame 15 having an opening 16 rectangular in cross section and of a slightly greater width than the width of the beam. The frame-like head 15 is provided with a sight opening 17 having a bevelled portion 18 marked with a central hair line 19 adapted to register with the graduations 11 when the head 15 is moved or shifted along the beam 9. The slide frame 15 is provided with an extension 20 having a rectangular opening 21 forming parallel upper and lower frame bars 23 and 24. The rectangular opening 21 communicates with the beam receiving opening 16.

A wear plate 25 is received along one of the longitudinal edges of the rectangular opening 16 and has its opposite end upwardly bent as at 26 to embrace the edges of the slide frame 15 and said wear plate is adapted to slidably engage one of the edge walls of the beam 9 and may be adjusted by means of a screw 27 threaded within an opening 28 of the sliding frame 15 so that the inner end of the screw will engage the central portion of the wear plate and urge the same toward the right when the knurled portion 29 of said screw is turned. Similar wear shoes 30 having upturned ends 31 are received along the opposite end wall of the slot 16 and are adapted to engage and slidably move over the partial threads 14 along the edge wall of the beam 9. The wear plates 30 are slightly recessed as at 32 for receiving a coil spring 33 the opposite end of which is received in an opening 34 in the edge wall of the slot 16. It is to be noted that a pair of wear plates 30 is provided and that one is arranged on each side of the rectangular opening 21 to provide a three point contact to facilitate the equal movement of the frame 15 relative to the beam 9 when the thumb screw 27 is operated to cause the frame to move toward the right or left.

Formed in the upper frame bar 23 is an opening adapted to receive a centering pin 36 arranged in parallel relation with the beam 9 and, similarly, an opening 37 is formed in the frame bar 24 in direct alignment with the opening 35 for receiving an adjustable centering pin 38. Each of the centering pins 36 and 38 is provided with tapered ends 39 and 40 respectively in direct alignment for receiving a rotary barrel 41 having an enlarged screw threaded portion 42 the threads of which are spirally arranged and are identical in size to the threads 14 along one edge of the beam 9. The threads of the adjusting worm or screw 42 are adapted to mate with the threads 14 when the frame 15 is urged to the right by tightening the screw 27. The barrel 41 is adapted to slidably receive a graduated collar 43 having graduations 44 which are adapted to register with a marking on a pointer 45 secured to the frame 20 by means of a screw or the like 46. One end of the barrel 41 is screw threaded for receiving a knurled locking collar 47 to clamp the graduated collar 43 securely in place on the barrel 41 and between the enlarged threaded portion 42 and the knurled collar 47. The frame 15 is provided with an arm extension 48 having a lower straight edge 49 which is coextensive with the straight edge of the frame bar 24 and said straight edge 49 is adapted to be positioned at exactly 90 degrees from the beam 9. A work engaging contact 50 is secured to the arm extension 48 by means of a clamp 51 and an adjusting screw 52 is provided for clamping the work engaging contact 50 securely in position on the arm extension 48. As the work engaging contact 50 becomes worn the clamp 51 may be loosened and released by unscrewing the adjusting screw 52 so that a new work engaging contact may be substituted in lieu of the old worn contact.

In the operation of the gauge it will be seen that by loosening the screw 27 the wear plate 25 will allow the spring loaded wear plates 30 to move the slide frame 15 so that the threads of the micrometric worm 42 will disengage from the partial threads 14 along one edge of the beam 9. When such disengagement has taken place the slide frame 15 may be moved along the beam 9 so that the hair line marking 19 may be placed in registry with one of the graduations 11. When the hair line marking 19 is in registry with one of the graduations 11 the knurled thumb screw 27 is turned to tighten the slide screw 16 upon the beam 9 and to move the slide frame 15 toward the right so that the spiral threads of the micrometric adjusting screw 42 will engage the partial spiral threads 14 on the beam 9. By rotating the knurled collar about the axis of the centering pins 39 and 40 the slide frame 15 may be moved a fractional part of an inch determined by aligning the predetermined graduations 44 on the graduated drum 43 into registry with one end of the pointer 45. Since one complete revolution of the micrometric worm 42 will move the slide frame 15 a distance equal to the space between the secondary and tertiary markings 12 and 13, a partial rotation of the worm will move the slide frame a fractional distance between these two markings so that the slide frame can be moved a minute portion of an inch depending upon the graduations on the graduated collar 43. It is intended to provide the centering pin 38 with screw threads for engaging similar screw threads in the opening 37 so that the centering pin 38 may be moved to compensate for wear and to maintain accurate relationship between the slide frame 15 and the beam 9.

During the calculation of the layout distances the thumb screw 27 may be loosened to allow the micrometric worm 42 to disengage from the partial threads 14 on the beam 9 and then by rotating the knurled thumb piece 47 so as to bring a desired graduation 44 in registry with the pointer 45 the slide frame may be moved so that one of the graduations 42 is in registry with the hair line 19. By then tightening the screw 27 the threads of the micrometric worm 42 will engage the partial threads 14 and cause the slide frame 15 to move a fraction of an inch in accordance with the predetermined position at the graduated collar 43, thereby automatically adjusting the slide head 15 to a predetermined distance without requiring numerous sight readings and frequent inspection of the various graduation marks or registering hair lines.

It is to be understood that the form of the invention shown and described herewith is to be taken as a preferred embodiment of the same and that various changes in the shape, size and arrangement of parts can be resorted to without departing from the spirit of the invention or the scope of the subjoined claims.

What I claim is:

1. A measuring instrument comprising a straight edge having worm engaging teeth along one edge thereof, a slide frame mounted on the straight edge, an adjusting worm carried by the slide frame normally disengaged from said teeth, said slide frame being laterally movable to facilitate said worm operably engaging the straight edge, a slide shoe engaging the opposite side of said straight edge, and a set screw carried by said frame engaging said slide for moving said slide frame laterally to cause said adjusting worm to engage and disengage said teeth on said straight edge.

2. A measuring instrument, comprising a straight edge having worm engaging teeth, a slide mounted on the straight edge for longitudinal and lateral movement, a micrometric adjusting worm carried by the slide adapted to operably engage the straight edge, a slide shoe carried by the slide engaging the other side of said straight edge, a set screw threaded in the slide engaging said shoe to move said slide laterally and cause said worm to engage said teeth, centering pins for the micrometric adjusting member mounted in the slide, and resilient members disposed on opposite sides of said micrometric worm for urging said slide laterally and disengaging said worm from said worm teeth.

3. A measuring instrument comprising a base, a straight edge secured to said base having worm engaging teeth, a slide frame movably mounted on the straight edge having an offset contact, said frame being slidable along said straight edge and laterally movable relative thereto, a barrel rotatably mounted between a pair of centers carried by the frame, a micrometric adjusting worm formed on said barrel for being operably moved into engagement with the worm engaging teeth on said straight edge, a graduated collar mounted on said barrel adapted to indicate the position of the threads on said worm relative to said teeth, a knurled clamping collar on the said barrel to retain the graduated collar in position, an adjustable slide shoe carried by said frame in opposed relation to said adjusting worm for moving said frame laterally and causing said worm to engage said teeth, and a retention device for urging said frame in the other lateral direction for disengaging said worm and teeth.

4. A measuring instrument comprising a base, a straight edge secured to said base having worm engaging teeth along one side edge thereof, a slide frame movably mounted relative to said straight edge having a work engaging contact, said slide frame being movable laterally of said straight edge, a micrometric adjusting worm rotatably mounted in an opening in the frame normally disengaged from said teeth, an adjusting screw carried by the frame in opposite relation to said worm for moving said frame laterally and causing the micrometric worm to be moved into operable engagement with said teeth on the straight edge and yielding spring members located at opposite ends of said worm for urging said worm away from said straight edge upon loosening of the adjusting screw.

5. A measuring instrument, comprising a base, a beam secured to said base, said beam having a series of worm engaging teeth and extending perpendicular thereto, a slide frame mounted on said beam for longitudinal movement thereon, said slide frame being capable of lateral movement on said beam, a work engaging contact formed on said frame, a pair of opposed centering pins carried by the frame at each end of an opening therein, a micrometric adjusting worm rotatably positioned within said opening in the frame between the pair of centers therein, yielding spring elements on each side of said worm for urging said adjusting worm away from the series of worm engaging teeth in said beam and screw adjusting means disposed on the opposite side of said frame and beam for urging said micrometric adjusting worm into operable engagement with the worm engaging teeth on said beam.

6. A measuring instrument comprising a beam having a series of partial screw threads along one edge thereof, a slide frame having a work contact movably mounted on the beam, a micrometric adjusting worm mounted within an opening in the frame, a pair of aligned centering pins in said frame disposed one at each end of said opening for rotatably supporting said micrometric adjusting worm, an adjusting screw threaded in the frame in opposed relation to said adjusting worm for moving the micrometric adjusting worm into operable mating relation with the partial screw threads along one edge of said beam and a yielding slide shoe at each side of said worm adapted to travel over said partial screw threads for urging said adjusting worm out of engagement with the partial threads on the beam.

7. A measuring instrument, comprising a straight edge beam having a series of partial screw threads along one edge thereof, a slide frame movably mounted on the beam having an offset contact, a micrometric adjusting screw rotatably mounted within an opening in said frame operably engaging the partial threads on the edge of the beam, spring loaded slide shoes disposed at each end of said adjusting screw for normally urging said micrometric adjusting worm out of engagement with said partial threads and an adjustable slide shoe carried by the slide frame in opposed relationship to said spring loaded slide shoes for moving said slide laterally of said beam and causing said worm to be moved into operable meshing relationship with said partial threads on the edge of the beam.

8. A measuring instrument, comprising a base, a beam having a series of partial screw threads along one edge thereof, said beam being connected to said base and extending perpendicular therefrom, a slide frame having a pair of transverse openings arranged at right angles to one another, one of said openings being slightly larger than the other to slidably and loosely receive said beam, a micrometric adjusting worm located in the other opening, a pair of centering pins on each side of the last mentioned opening for rotatably supporting said micrometric adjusting worm, spring loaded wear plates on opposite sides of the adjusting worm to engage said partial screw threads and thereby urge said worm out of engagement with the beam and an adjustable wear plate in opposed relation to the spring loaded wear plates to move said slide frame laterally against the action of said spring loaded wear plates thereby causing said micrometric adjusting worm to be shifted into operable engagement with the partial screw threads along one edge of said beam.

9. A measuring instrument, comprising a base, a beam connected to said base and extending perpendicular therefrom, said beam having a series of spiral notches forming a partial screw thread along one edge thereof, a slide frame having a pair of transverse openings arranged at right angles to one another, one of said openings being slightly larger than the other to slidably and loosely receive said beam, a micrometric adjusting worm located in the other opening, a pair of centering pins on each side of the last-mentioned opening for rotatably supporting said micrometric adjusting worm, spring loaded wear plates on opposite sides of the adjusting worm to engage and ride over said partial screw threads and to urge said worm out of engagement with the partial screw threads on the beam, and an adjustable wear plate in opposed relation to the spring loaded wear plate to engage and slide over the other edge of said beam to thereby move said slide frame laterally of the beam and cause said micrometric adjusting worm to be shifted into operable meshing engagement with said partial screw threads on the beam.

10. A measuring instrument, comprising a beam having a straight edge provided with a series of partial screw threads extending transversely thereof, a slide frame having an opening therein offset from the beam, a work engaging contact carried by the frame, a pair of centering pins mounted in the frame on opposite sides of said opening in direct alignment and parallel with said beam, a rotatable barrel mounted in said opening between said centering pins, a micrometric adjusting worm formed on said barrel having threads adapted to mesh with the partial screw threads on the beam, a graduated sleeve on said barrel adjacent the micrometric worm, a threaded knurled collar for clamping the graduated sleeve in position, a pair of spring pressed wear plates on opposite sides of the micrometric adjusting worm for engaging the partially threaded edge of said beam and urging said worm away from the partial screw threads on the beam and an adjustable wear plate on the frame having frictional sliding contact with the opposite edge of beam for moving the slide frame laterally and causing said micrometric worm to be shifted into meshing engagement with said partial screw threads on the beam.

JAMES ZWEEKLY.